United States Patent
Griffin et al.

(10) Patent No.: US 7,675,820 B2
(45) Date of Patent: Mar. 9, 2010

(54) METHOD OF CHARACTERIZING A VEHICLE CRASH EVENT BASED ON SHEAR WAVES IN THE VEHICLE FRAME

(75) Inventors: Dennis P Griffin, Noblesville, IN (US); William W. Fultz, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 258 days.

(21) Appl. No.: 11/787,497

(22) Filed: Apr. 17, 2007

(65) Prior Publication Data

US 2008/0259729 A1 Oct. 23, 2008

(51) Int. Cl.
*G01S 3/808* (2006.01)
(52) U.S. Cl. .................................... 367/127
(58) Field of Classification Search ............... 367/127, 367/118; 280/735
See application file for complete search history.

(56) References Cited

U.S. PATENT DOCUMENTS

| 4,346,914 A | 8/1982 | Livers et al. |
| 4,842,301 A | 6/1989 | Feldmaier |
| 6,595,544 B1 | 7/2003 | Hermann |

2008/0259729 A1 * 10/2008 Griffin et al. .............. 367/117

FOREIGN PATENT DOCUMENTS

| EP | 0 677 431 | 10/1995 |
| WO | 99/17965 | 4/1999 |

OTHER PUBLICATIONS

Dunegan, Modal Analysis of Acoustic Emission Signals, DECI Newsletters and Reports, Oct. 1997.
Hamstad, Gallagher & Gary, A Wavelet Transform Applied to Acoustic Emission Signals: Part 1: Source Identification, Journal of Acoustic Emission vol. 20 (2002).
European Search Report dated Aug. 11, 2008.
Brandmeier, Thomas: ""Köperschall—Der Klang des Crashs" in Forschungsbericht 2005" 2005, Institut Fuer Angewandte Forschung (IAF), Fachhochschule Ingolstadt, XP002491714, pp. 6-7.

* cited by examiner

*Primary Examiner*—Dan Pihulic
(74) *Attorney, Agent, or Firm*—Thomas N. Twomey

(57) ABSTRACT

A vehicle crash event is detected and characterized based on the transmission of acoustical shear waves through the vehicle frame. At least three, and preferably four or more, acoustical emission sensors longitudinally and laterally distributed on the vehicle frame produce acoustical signals that are processed to extract the shear wave energy due to impacts. Since shear waves are non-dispersive and travel through the vehicle frame at a known velocity, they can be detected in any part of the frame. The extracted shear wave signals are used not only to judge the severity of the impact, but also to characterize the type of crash and determine the direction of the impact based on when the shear wave is detected by each of the acoustical emission sensors.

15 Claims, 3 Drawing Sheets

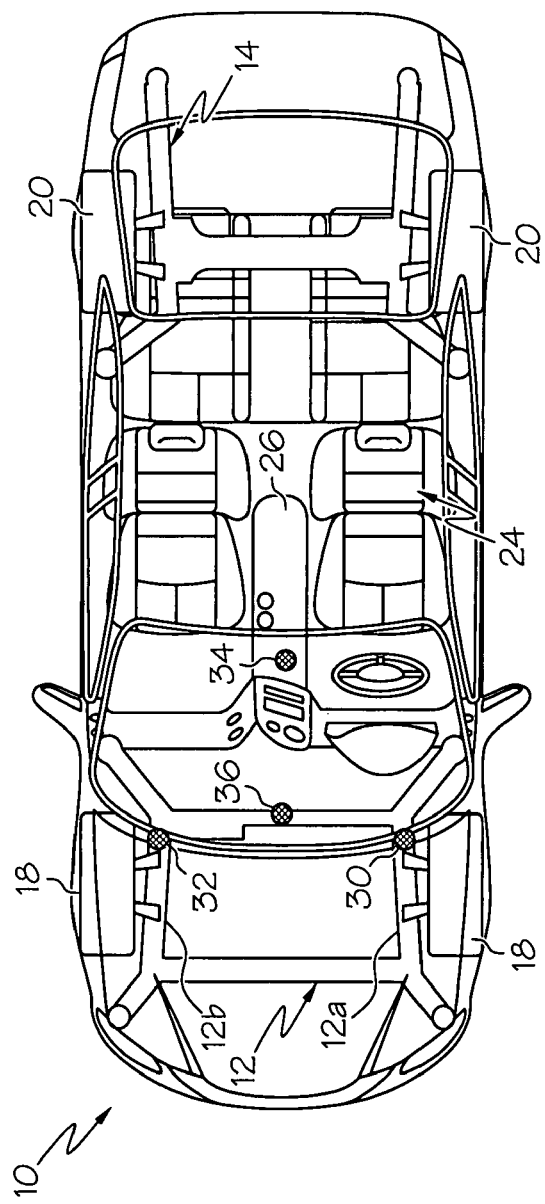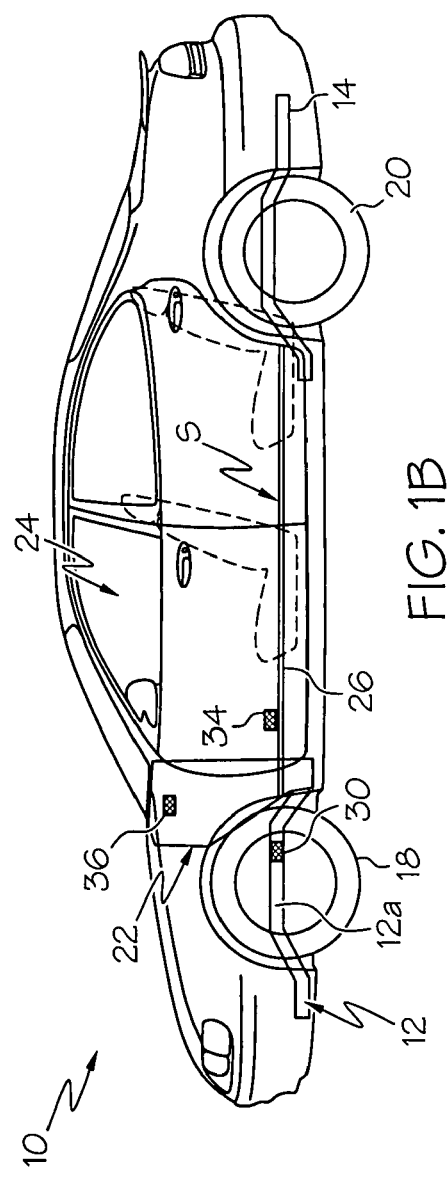
FIG. 1A
FIG. 1B

METHOD OF CHARACTERIZING A VEHICLE CRASH EVENT BASED ON SHEAR WAVES IN THE VEHICLE FRAME

TECHNICAL FIELD

The present invention relates to a method of using acoustic emission sensing to detect and characterize a vehicle crash event based on shear wave transmission in the vehicle frame.

BACKGROUND OF THE INVENTION

Acoustic Emission (AE) sensors have been used for failure analysis in metal structures because deformations due to structural impacts or shifting produce acoustical waves that travel through the structure. For the same reason, the automotive industry has considered using AE sensors to detect acoustic wave energy in the frame of a vehicle for purposes of recognizing a crash event for which supplemental restraints such as air bags should be deployed. See, for example, the U.S. Pat. No. 4,346,914 to Livers et al. and the U.S. Pat. No. 4,842,301 to Feldmaier. In Feldmaier, for instance, AE sensors attached to the vehicle frame rails near the front of the vehicle produce acoustic wave energy signals, and a filter circuit isolates the signal content associated with deformation in order to discriminate crash events from abuse events; supplemental restraints are deployed when the amplitude and duration of the isolated signal satisfy predetermined criteria.

SUMMARY OF THE INVENTION

The present invention is directed to an improved method of detecting and characterizing a vehicle crash event based on the transmission of acoustical shear waves through the vehicle frame. At least three, and preferably four or more, AE sensors longitudinally and laterally distributed on the vehicle frame produce signals that are processed to extract the shear wave energy due to impacts. Since shear waves are non-dispersive and travel through the vehicle frame at a known velocity, they can be detected in any part of the frame, and the extracted signals are used not only to judge the severity of the impact, but also to characterize the type of crash and to determine the direction of the impact based on the times of arrival of the shear wave at the various sensor locations.

BRIEF DESCRIPTION OF THE DRAWINGS

FIGS. 1A and 1B depict a vehicle and its frame from the top and side, respectively, and illustrate a preferred placement of four AE sensors according to this invention;

DESCRIPTION OF THE PREFERRED EMBODIMENT

Figure 2:
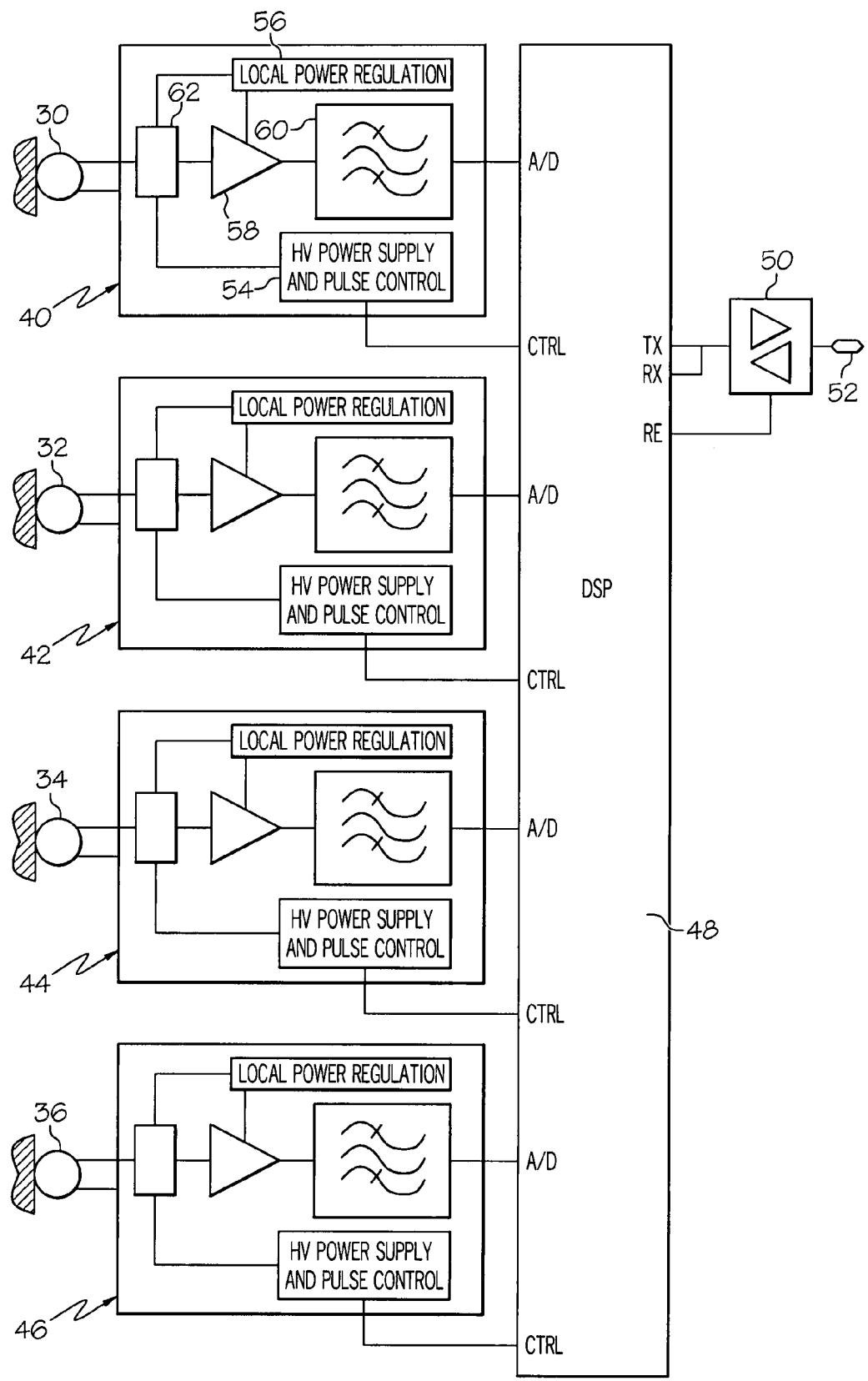
FIG. 2 is a system block diagram of a signal processing circuit, including a digital signal processor (DSP), for acquiring and processing signals produced by the AE sensors of FIGS. 1A-1B according to this invention.

Referring to FIGS. 1A and 1B, the reference numeral 10 generally designates a vehicle having front and rear sub-frames 12 and 14. In general, the front sub-frame supports front bumper (not shown) and front wheels 18 (along with the engine in most cases), while the rear sub-frame supports the rear bumper (not shown) and rear wheels 20. A firewall assembly 22 disposed forward of the passenger compartment 24 laterally spans the inboard end of the front sub-frame 12, and a tunnel assembly 26 disposed along the longitudinal axis of the vehicle 10 joins the front and rear sub-frames 12 and 14. The sub-frames 12 and 14 and the firewall and tunnel assemblies 22 and 26 are mechanically joined (by welding, for example), and are considered to collectively comprise the vehicle frame for purposes of this invention.

According to this invention, a set or array of piezoelectric AE sensors are mounted on the above-described frame elements in longitudinally and laterally distributed fashion so that shear wave energy due to vehicle impact will be differentially detected by the sensors depending on the distance between the sensors and the point of impact. As explained below, the signals from the various sensors and their temporal relationship are analyzed to determine not only the severity of the impact, but also the direction of the impact. Key to this analysis is the extraction of the shear wave components of the sensed acoustic energy since shear waves are non-dispersive by nature and travel through the vehicle frame elements at a known, material-dependent, velocity.

Referring to FIGS. 1A-1B, the basic AE sensor set includes a left-front sensor 30, a right-front sensor 32, and a tunnel sensor 34 located rearward of the sensors 30 and 32. The left-front and right-front sensors 30 and 32 are respectively attached to the left side rail 12a and right side rail 12b of the front sub-frame 12, while the tunnel sensor 34 is attached to the tunnel assembly 26. The sensors 30, 32 and 34 define a sensing plane S that is generally horizontal or parallel to the road surface, and are used as described below to determine an impact vector on the sensing plane S due to a crash event. An optional fourth AE sensor 36 is attached to the firewall assembly 22 above the horizontal sensing plane S.

From a processing standpoint, the shear wave signal amplitudes and the differences in their time-of-arrival at the various sensor locations are used to determine an impact vector comprising the crash amplitude and the direction of impact. Combining the shear wave information from sensor 36 with the information from sensors 30, 32 and 34 enables the determination of an impact vector in three-dimensional (3D) space, which is useful for discriminating impacts that may contribute to or result in a roll-over event. The shear wave signals may also be used to classify a detected crash event by correlating them with a library of stored shear wave signatures that are characteristic of different crash event classifications. Finally, since the AE sensors 30, 32, 34, 36 are piezoelectric, they are preferably used for sensor diagnosis when the vehicle is stationary and the sensor outputs are substantially zero. Under these conditions, an electrical pulse is supplied to a selected one of the AE sensors to create a predetermined acoustical emission, and the resulting signals produced by the other AE sensors are sampled to verify their proper operation.

FIG. 2 illustrates a system block diagram including a digital signal processor (DSP) 48 for implementing the method of the present invention with the four-sensor configuration depicted in FIGS. 1A-1B. Referring to FIG. 2, a set of four sensor interface circuits 40, 42, 44, 46 individually couple the AE sensors 30, 32, 34, 36 to DSP 48. The DSP 48 performs crash analyses as described herein, and reports the results (impact vector data, crash classification, and sensor status) to various other electronic modules (such as an airbag control module) via communication interface 50 and high-speed bus 52. The bus 52 and interface 50 may also be used for receiving vehicular parameters of interest such as vehicle speed, transmission range, etc.

The illustrated sensor interface circuits 40, 42, 44, 46 are identical in content and function, are preferably co-located with the respective sensors 30, 32, 34, 36 to optimize signal-to-noise ratio. As indicated in respect to the interface circuit 40, each includes a Power Supply and Pulse Control block 54, a Local Power Regulation block 56, a signal amplifier 58, and a band-pass filter 60. The block 62 signifies a signal junction and electrical connector. In general, the Power Supply and Pulse Control block 54 has two functions: (1) supplying an input voltage to Local Power Regulation block 56, and (2) supplying a voltage pulse signal to the respective AE sensor 30 when commanded by DSP 48 via control (CTRL) line 66. The Local Power Regulation block 56 provides a regulated operating voltage to amplifier 58 and band-pass filter 60. Signals produced by the respective AE sensor 30 are amplified by amplifier 58, filtered by band-pass filter 60, and provided on line 64 as an analog input to an A/D port of DSP 48. Alternately, of course, the A/D function could be implemented at the respective interface circuit 40-46. The band-pass filter 60 generally isolates the AE signals of interest, and may be configured to pass signals in frequency range of 30 kHz to 200 kHz, for example. During a diagnostic mode, DSP 48 signals Power Supply and Pulse Control block 54 via control line 66 to supply an electrical pulse to a respective AE sensor 30 to create a predetermined acoustical emission that is transmitted through the vehicle sub-frame 12 and detected by the other AE sensors 32-36 for diagnostic purposes.

Figure 3:
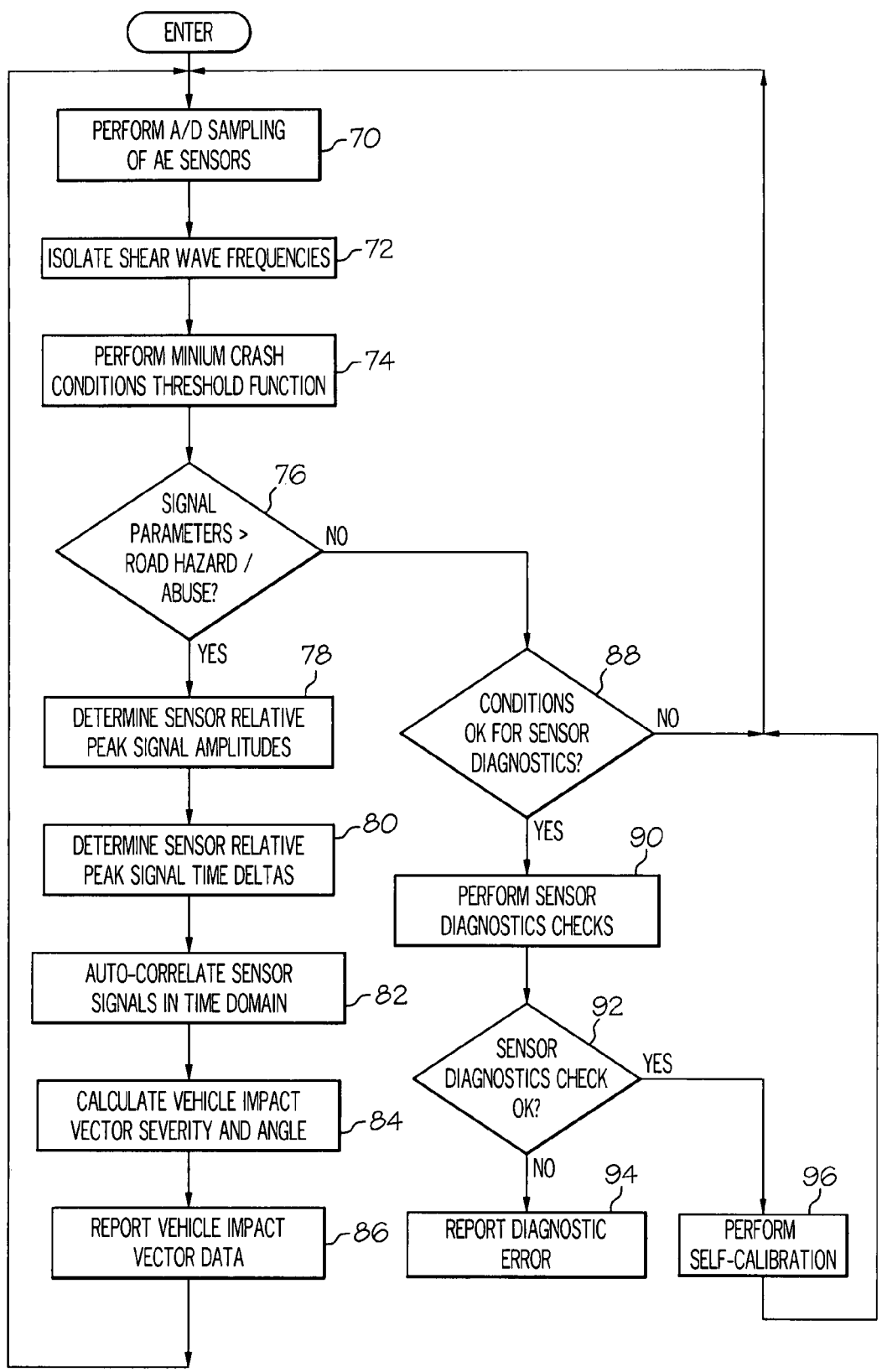
FIG. 3 is a flow diagram representative of a signal processing method carried out by the DSP of FIG. 2 according to this invention.

FIG. 3 is a flow diagram representative of a signal processing routine carried out by DSP 48 for the three primary AE sensors 30, 32 and 34, though it will be understood that the described signal processing steps can be readily extended to include additional AE sensors such as the sensor 36. Referring to FIG. 3, the blocks 70-72 are first executed to sample the digitized AE sensor signals and to isolate the shear wave content of each signal. The shear waves are isolated by frequency, as their frequency (or frequency band) depends on the acoustic transmission characteristics of the vehicle frame elements. The shear wave frequency is determined empirically for a given type of frame structure (i.e., a given vehicle model) and DSP 48 preferably utilizes a Fast-Fourier Transform (FFT) or Infinite Impulse Response (IIR) filter function to digitally isolate the AE signal content corresponding to that frequency or band of frequencies.

Block 74 normalizes the shear wave data and compares the amplitude and duration of the normalized data with calibrated amplitude and duration thresholds defining a minimum-energy crash event (i.e., the minimum crash energy for which supplemental restraints should be deployed). The primary purpose of this step is to discriminate between a significant crash event and road hazard or abuse events for which supplemental restraints should not be deployed. Block 76 determines if the signal amplitude and duration thresholds are satisfied. If so, the blocks 78-86 are executed to characterize the crash event and report the results on system bus 52; if not, the blocks 88-96 are executed to carry out a diagnostic test of the sensors 30-36 under specified diagnostic conditions.

Once a minimum-energy crash event is identified based on the shear wave amplitude and duration, blocks 78 and 80 are executed to identify the peak signal amplitude of each shear wave signal and to determine the differences in time-of-arrival of the peak amplitudes at the various AE sensor locations. The later step involves identifying the AE sensor that first sensed the impact shear wave, and then determining the time delays or deltas for the shear wave to be detected at the other AE sensor locations. These time deltas provide a rough indication of the impact angle (by quadrant, for example), and block 82 performs a time-domain correlation of the sensed shear wave data with a library of stored shear wave crash signatures for test crashes at similar impact angles. In other words, DSP 48 identifies a subset of the stored shear wave crash signatures for test crashes characterized by impact directions similar to the determined impact angle and performs a time-domain correlation of the sensed shear wave data with the stored shear wave signatures for the identified subset of test crashes. If the correlation process identifies a sufficiently close match between the measured data and a stored crash signature, the impact is classified based on the classification of that crash signature, and DSP 48 reports the classification at block 86.

Additionally, the relationship of the determined time deltas between the first, second and third AE sensors to detect the impact shear wave can be used in a diagnostic sense to verify the plausibility of the measured data. For example, given the rough impact angle, the time delta between the first and second AE sensors, the known shear wave velocity, and the shear wave coupling distance between the AE sensors, DSP 48 can specify an allowable range for the time delta between the first and third AE sensors. The measured data is deemed implausible if the determined time delta is outside the specified range; in this case, no conclusions regarding the detected impact can be drawn and a diagnostic error report is generated.

Block 84 uses the time deltas of block 80 to determine an impact angle for the crash event. As mentioned above, it is possible to calculate the impact angle on the basis of the time differences (and the known locations of the sensors 30-34) because shear waves are non-dispersive and travel through the vehicle frame at a fixed and known velocity related to the frame material. For example, shear waves travel through steel at a velocity of approximately 3200 meters/second, regardless of the frame thickness. With the three AE sensors 30-34, any impact vector in the sensing plane S can be calculated. With the addition of the fourth vertically displaced AE sensor 36, the impact vector can be calculated in 3D space and is not limited to the sensing plane S. Block 86 reports the magnitude and angle of the impact vector, along with the crash classification (if any) determined at block 82. The magnitude (which may be based on the peak amplitudes determined at block 78) indicates the severity of the crash event, and the angle indicates the direction of the impact. These quantities are reported to other electronic modules of the vehicle, and can be used to decide which supplemental restraints (if any) should be deployed, when they should be deployed, and the required deployment force.

Preferably, DSP 48 determines the impact angle by table look-up based on the determined time deltas. In this approach, the table is populated with time delta values corresponding to various impact angles. The time delta values can be calculated by considering the leading edge of the impact shear wave as a line tangent to a unit circle that includes the three primary AE sensors 30-34. The distance from each AE sensor to the tangent line corresponds to a time-of-detection for that sensor. These distances can be algebraically determined and then converted to corresponding times based on the known shear wave velocity. The determined times are referenced to the shortest time to form time deltas, and these time deltas become the table entries. When an impact is detected, DSP 48 uses the time deltas determined at block 80 to index the table and find the corresponding impact angle.

In cases where the shear wave amplitude and duration fail to satisfy the minimum crash event thresholds (i.e., where block 76 is answered in the negative), the block 88 determines if specified conditions for entering a sensor diagnostic mode are met. The entry conditions may be both systemic (e.g., range selector in Park, or in Neutral at zero vehicle speed and brakes applied) and temporal (e.g., a minimum repetition interval). If the entry conditions are satisfied, the block 90 is executed to individually and successively pulse the AE sensors 30-36 while monitoring the signals produced by the other AE sensors, as mentioned above in respect to FIG. 2. If the AE sensors 30-36 fail to properly respond to the acoustic emissions produced by the diagnostic pulsing, block 92 is answered in the negative; block 94 reports the sensor error(s) and further execution of the processing routine is suspended. If the AE sensors 30-36 respond to the diagnostic pulsing, block 92 is answered in the affirmative even if the signal time-of-arrival at one or more of the AE sensors deviates from a calibrated standard or norm by no more than a specified amount. In this later case, block 96 is executed to perform a self-calibration procedure in which the timing standards and other calibrations are adjusted to compensate for sensor drift and changes in the acoustic transmission characteristics of the vehicle frame.

In summary, the method of the present invention provides significantly enhanced information about vehicle crash events, thereby enabling better and more appropriate restraint deployment decisions. Furthermore, the information is produced earlier in the crash event due to the immediate generation and transmission of acoustic wave energy (compared to vehicle acceleration, for example), enabling more timely deployment of restraints when the crash event is sufficiently severe.

While the present invention has been described with respect to the illustrated embodiment, it is recognized that numerous modifications and variations in addition to those mentioned herein will occur to those skilled in the art. Accordingly, it is intended that the invention not be limited to the disclosed embodiment, but that it have the full scope permitted by the language of the following claims.

The invention claimed is:

1. A method of characterizing an impact to a vehicle, comprising the steps of:
   sensing acoustic emission wave energy in a frame of the vehicle;
   isolating shear wave components of the sensed acoustic emission wave energy;
   characterizing a transmission of the isolated shear wave components through the frame to determine a direction of the impact;
   sensing the acoustic emission wave energy at first, second and third distributed locations on the frame;
   isolating the shear wave components of the sensed acoustic emission wave energy at each of the first, second and third locations;
   characterizing the transmission of the isolated shear wave components through the frame by identifying at time-of-arrival of the shear wave components at the first, second and third locations;
   determining the direction of the impact based on the identified times-of-arrival;
   evaluating the identified times-of-arrival for plausibility; and
   issuing a diagnostic error report if the evaluation reveals that identified times-of-arrival are implausible.

2. A method of characterizing an impact to a vehicle, comprising the steps of:
   sensing acoustic emission wave energy in a frame of the vehicle;
   isolating shear wave components of the sensed acoustic emission wave energy;
   characterizing a transmission of the isolated shear wave components through the frame to determine a direction of the impact;
   sensing the acoustic emission wave energy at first, second and third distributed locations on the frame;
   isolating the shear wave components of the sensed acoustic emission wave energy at each of the first, second and third locations;
   characterizing the transmission of the isolated shear wave components through the frame by identifying at time-of-arrival of the shear wave components at the first, second and third locations;
   determining the direction of the impact based on the identified times-of-arrival;
   storing a table of shear wave times-of-arrival vs. impact direction; and
   determining the impact direction by indexing the stored table based on the identified times-of-arrival.

3. A method of characterizing an impact to a vehicle, comprising the steps of:
   sensing acoustic emission wave energy in a frame of the vehicle;
   isolating shear wave components of the sensed acoustic emission wave energy;
   characterizing a transmission of the isolated shear wave components through the frame to determine a direction of the impact;
   sensing the acoustic emission wave energy at first, second and third distributed locations on the frame, wherein the first, second, and third locations define a sensing plane that is substantially parallel to a road surface on which the vehicle is supported;
   isolating the shear wave components of the sensed acoustic emission wave energy at each of the first, second and third locations;
   characterizing the transmission of the isolated shear wave components through the frame by identifying at time-of-arrival of the shear wave components at the first, second and third locations;
   determining the direction of the impact based on the identified times-of-arrival;
   sensing the acoustic emission wave energy at a fourth location on the frame that is vertically displaced from the sensing plane defined by the first, second and third locations;
   isolating the shear wave components of the sensed acoustic emission wave energy at the fourth location;
   characterizing the transmission of the isolated shear wave components through the frame by identifying at time-of-arrival of the shear wave components at the first, second, third and fourth locations; and
   determining the direction of the impact based on the identified times-of-arrival.

4. A method of characterizing an impact to a vehicle, comprising the steps of:
   sensing acoustic emission wave energy in a frame of the vehicle;
   isolating shear wave components of the sensed acoustic emission wave energy;
   characterizing a transmission of the isolated shear wave components through the frame to determine a direction of the impact;
   performing a time-domain correlation of the isolated shear wave components with a library of stored shear wave signatures for different test crashes; and
   if the correlation reveals a sufficiently close match between the isolated shear wave components and the stored shear wave signatures for a given test crash, classifying the impact based on a classification of the given test crash.

5. The method of claim 4, including the steps of:
identifying a set of test crashes characterized by impact directions similar to the determined direction of impact; and
performing the time-domain correlation of the isolated shear wave components with the stored shear wave signatures for the identified set of test crashes.

6. A method of characterizing an impact to a vehicle, comprising the steps of:
sensing acoustic emission wave energy in a frame of the vehicle;
isolating shear wave components of the sensed acoustic emission wave energy;
characterizing a transmission of the isolated shear wave components through the frame to determine a direction of the impact;
sensing the acoustic emission wave energy with a plurality of piezoelectric acoustic emission sensors mounted on the frame; and
applying an electrical pulse to a selected piezoelectric acoustic emission sensor to create a test acoustic emission, and monitoring signals produced by the other piezoelectric acoustic emission sensors to diagnostically test such other sensors.

7. The method of claim 6, including the step of:
diagnostically evaluating said other piezoelectric acoustic emission sensors based on sensed times-of-arrival of the test acoustic emission.

8. The method of claim 7, including the step of:
auto-calibrating to compensate for sensor drift and changes in the frame based on deviations in the sensed times-of-arrival from calibrated norms.

9. The method of claim 1, including the step of:
determining a severity of the impact based on a magnitude of the isolated shear wave components.

10. The method of claim 2, including the step of:
determining a severity of the impact based on a magnitude of the isolated shear wave components.

11. The method of claim 3, including the step of:
determining a severity of the impact based on a magnitude of the isolated shear wave components.

12. The method of claim 4, including the step of:
determining a severity of the impact based on a magnitude of the isolated shear wave components.

13. The method of claim 6, including the step of:
determining a severity of the impact based on a magnitude of the isolated shear wave components.

14. The method of claim 1, wherein the first, second, and third locations define a sensing plane that is substantially parallel to a road surface on which the vehicle is supported.

15. The method of claim 2, wherein the first, second, and third locations define a sensing plane that is substantially parallel to a road surface on which the vehicle is supported.

* * * * *